(12) United States Patent
Park et al.

(10) Patent No.: US 9,685,649 B2
(45) Date of Patent: Jun. 20, 2017

(54) ELECTRODE ASSEMBLY AND SECONDARY BATTERY INCLUDING THE SAME

(71) Applicant: LG CHEM, LTD., Seoul (KR)

(72) Inventors: Ji Won Park, Daejeon (KR); Myung Hoon Ko, Daejeon (KR); Seung Ho Na, Daejeon (KR); Chang Bum Ahn, Daejeon (KR); Young Joo Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 33 days.

(21) Appl. No.: 14/306,973

(22) Filed: Jun. 17, 2014

(65) Prior Publication Data

US 2015/0086864 A1    Mar. 26, 2015

Related U.S. Application Data

(63) Continuation of application No. PCT/KR2014/002908, filed on Apr. 4, 2014.

(30) Foreign Application Priority Data

Sep. 25, 2013   (KR) .................. 10-2013-0114002

(51) Int. Cl.
*H01M 2/26* (2006.01)
*H01M 2/02* (2006.01)
*H01M 10/04* (2006.01)

(52) U.S. Cl.
CPC ......... *H01M 2/266* (2013.01); *H01M 2/0212* (2013.01); *H01M 10/0413* (2013.01); *H01M 10/0436* (2013.01); *H01M 2220/30* (2013.01)

(58) Field of Classification Search
CPC ...................................................... H01M 2/26
See application file for complete search history.

(56) References Cited

U.S. PATENT DOCUMENTS 5,585,206 A    12/1996    Morris
6,447,950 B1    9/2002    Iijima
(Continued)

FOREIGN PATENT DOCUMENTS

JP    62-139276 A    6/1987
JP    6-275323 A    9/1994
(Continued)

OTHER PUBLICATIONS

JP 2009123752 A translation from Espacenet.*
(Continued)

*Primary Examiner* — Barbara Gilliam
*Assistant Examiner* — Nathanael Zemui
(74) *Attorney, Agent, or Firm* — Birch, Stewart, Kolasch & Birch, LLP

(57) ABSTRACT

An electrode assembly according to an embodiment of the present invention includes a first electrode plate having a fist electrode tab at an end of one side thereof, a second electrode plate having a second electrode tab, which is formed in a same direction as a longitudinal direction of the first electrode tab and is formed at a position not overlapping the first electrode tab, and a protrusion which is formed at a position overlapping the first electrode tab, and a separator insulating the first electrode plate and the second electrode plate. Therefore, the electrode assembly according to the embodiment of the present invention and the secondary battery including the same may improve the stability of the secondary battery by preventing lithium ion accumulation in a separator.

9 Claims, 4 Drawing Sheets

(56) References Cited

U.S. PATENT DOCUMENTS

| | | | |
|---|---|---|---|
| 7,700,226 B2 | 4/2010 | Yong et al. | |
| 2002/0119367 A1* | 8/2002 | Watanabe | H01M 2/18 |
| | | | 429/129 |
| 2010/0215837 A1 | 8/2010 | Evans | |
| 2011/0129701 A1 | 6/2011 | Seo | |
| 2012/0135285 A1 | 5/2012 | Iwama et al. | |
| 2013/0004835 A1 | 1/2013 | Roy | |
| 2013/0171516 A1 | 7/2013 | Wang et al. | |

FOREIGN PATENT DOCUMENTS

| | | |
|---|---|---|
| JP | 2007-12598 A | 1/2007 |
| JP | 2009-123752 A | 6/2009 |
| JP | 2009123752 A * | 6/2009 |
| JP | 2012-18795 A | 1/2012 |
| JP | 2012-204334 A | 10/2012 |
| JP | 2012-204335 A | 10/2012 |
| KR | 10-2006-0068821 A | 6/2006 |
| KR | 10-2007-0099065 A | 10/2007 |
| KR | 10-2008-0009350 A | 1/2008 |
| KR | 10-2011-0060036 A | 6/2011 |
| TW | I258238 B | 7/2006 |
| TW | 201304950 A1 | 2/2013 |
| TW | I429128 B | 3/2014 |
| WO | WO 2008/155540 A1 | 12/2008 |
| WO | WO 2013/099280 A | 7/2013 |

OTHER PUBLICATIONS

Extended European Search Report, dated Sep. 9, 2015, for European Application No. 14731125.2.
European Office Action mailed Nov. 7, 2016.

\* cited by examiner

ELECTRODE ASSEMBLY AND SECONDARY BATTERY INCLUDING THE SAME

CROSS REFERENCE TO RELATED APPLICATIONS

This non-provisional application is a Continuation of International Application No. PCT/KR2014/002908 filed on Apr. 4, 2014, which claims priority to Korean Patent Application No. 10-2013-0114002 filed in the Republic of Korea on Sep. 25, 2013. The entire contents of all of the above applications are hereby incorporated by reference.

TECHNICAL FIELD

The present invention relates to an electrode assembly and a secondary battery including the same, and more particularly, to an electrode assembly having improved stability and a secondary battery including the same.

BACKGROUND ART

The use of portable electronic products having various functions as well as small size and low weight has been rapidly increased due to the development of electrical and electronic technologies. A battery is generally used as a power supply for the operation of the portable electronic products, wherein rechargeable secondary batteries are mainly being used.

Such secondary batteries have received attention as a new energy source for improving environmental friendliness and energy efficiency because the secondary batteries not only have a primary advantage of capable of significantly reducing the use of fossil fuels but also byproducts according to the use of energy are definitely not generated. A secondary battery includes an electrode assembly including a cathode, an anode, and a separator which is disposed between the cathode and anode and insulates the cathode and the anode.

DISCLOSURE OF THE INVENTION

Technical Problem

The present invention provides an electrode assembly having improved stability and a secondary battery including the same.

The object of the present invention is not limited to the aforesaid, but other objects not described herein will be clearly understood by those skilled in the art from descriptions below.

Technical Solution

According to an aspect of the present invention, there is provided an electrode assembly including: a first electrode plate having a first electrode tab at an end of one side thereof; a second electrode plate having a second electrode tab, which is formed in a same direction as a longitudinal direction of the first electrode tab and is formed at a position not overlapping the first electrode tab, and a protrusion which is formed at a position overlapping the first electrode tab; and a separator insulating the first electrode plate and the second electrode plate.

An area of the first electrode plate may be the same or smaller than an area of the second electrode plate.

At least one surface of the first electrode plate may be coated with a first electrode active material, and a surface of the first electrode tab, which extends from a surface of the first electrode plate coated with the first electrode active material, may be coated with the first electrode active material as long as a predetermined length in the longitudinal direction.

The protrusion may protrude from the second electrode plate to a point corresponding to the predetermined length.

At least one surface of the second electrode plate may be coated with a second electrode active material, and a surface of the protrusion, which extends from a surface of the second electrode plate coated with the second electrode active material, may be coated with the second electrode active material to the point corresponding to the predetermined length.

A width of the protrusion may be the same as a width of the first electrode tab.

According to another aspect of the present invention, there is provided a secondary battery including: an electrode assembly; and a pouch accommodating the electrode assembly, wherein the electrode assembly includes: a first electrode plate having a first electrode tab at an end of one side thereof; a second electrode plate having a second electrode tab, which is formed in a same direction as a longitudinal direction of the first electrode tab and is formed at a position not overlapping the first electrode tab, and a protrusion which is formed at a position overlapping the first electrode tab; and a separator insulating the first electrode plate and the second electrode plate.

At least one surface of the first electrode plate may be coated with a first electrode active material, and the first electrode tab may be coated with the first electrode active material as long as a predetermined length in the longitudinal direction.

The protrusion may protrude from the second electrode plate to a point corresponding to the predetermined length.

Advantageous Effects

An electrode assembly according to an embodiment of the present invention and a secondary battery including the same may improve stability.

Specifically, the electrode assembly according to the embodiment of the present invention and the secondary battery including the same may improve the stability of the secondary battery by preventing lithium ion accumulation in a separator.

MODE FOR CARRYING OUT THE INVENTION

Figure 1:
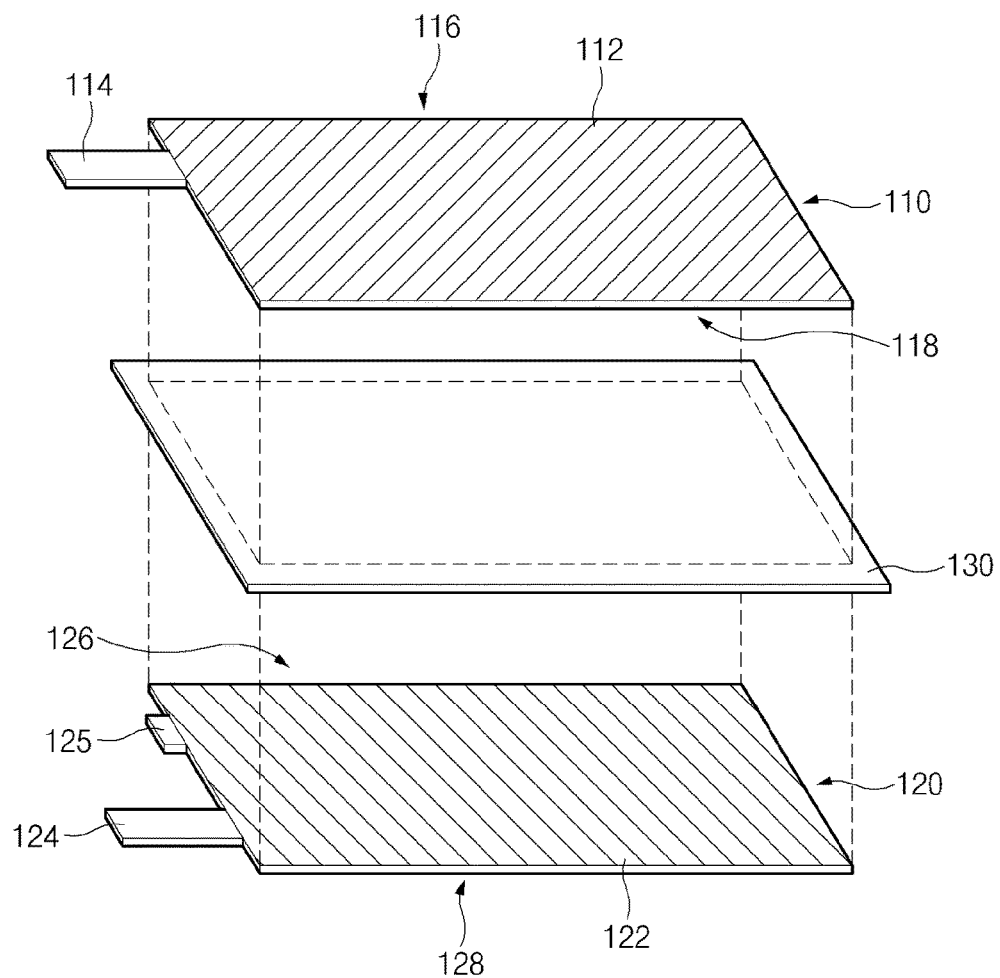
FIG. 1 illustrates a portion of an electrode assembly according to an embodiment of the present invention.

Hereinafter, the present invention will be described with reference to the accompanying drawings in which exemplary embodiments of the present invention are shown. In the drawings, like elements may be denoted by like reference numerals if possible. In the following descriptions of the embodiments of the present invention, well-known functions or constructions may not be described in detail so as not to obscure the invention in unnecessary detail. It will be understood that although the terms "first", "second", "A", "B", "(a)", "(b)", etc. may be used herein to describe various elements, these elements should not be limited by these terms. These terms are only used to distinguish one element from another element and are not intended to limit the nature and the sequence or order of the corresponding elements. It will also be understood that when an element is referred to as being "connected to," "coupled to," or "joined to" another element, it can be directly connected or joined to the other element, or intervening elements may also be present.

Figure 2:
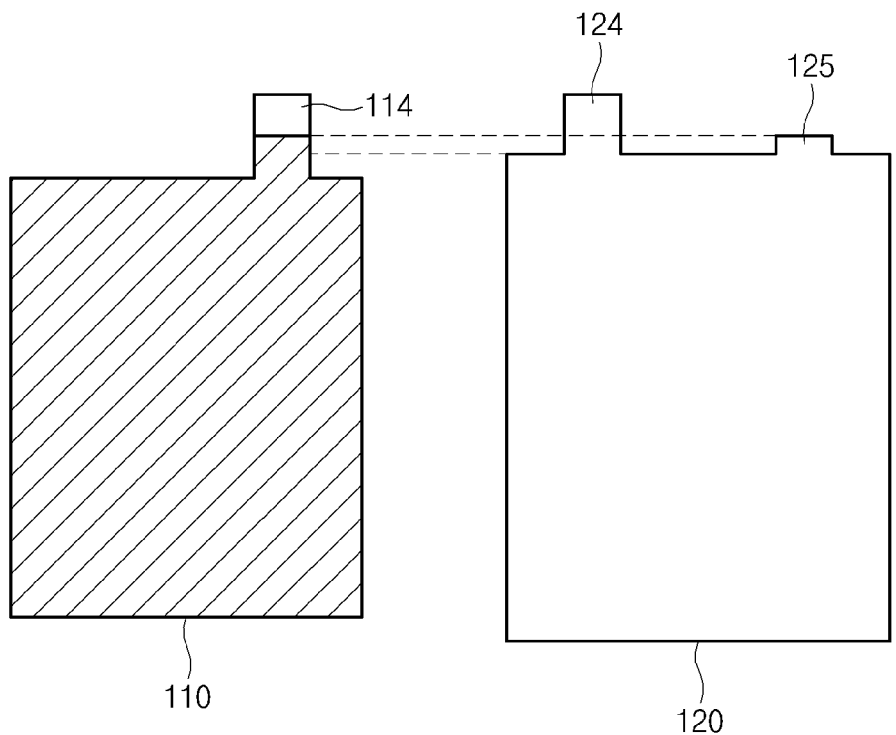
FIG. 2 illustrates a cathode plate and an anode plate which are illustrated in FIG. 1.
Figure 3:
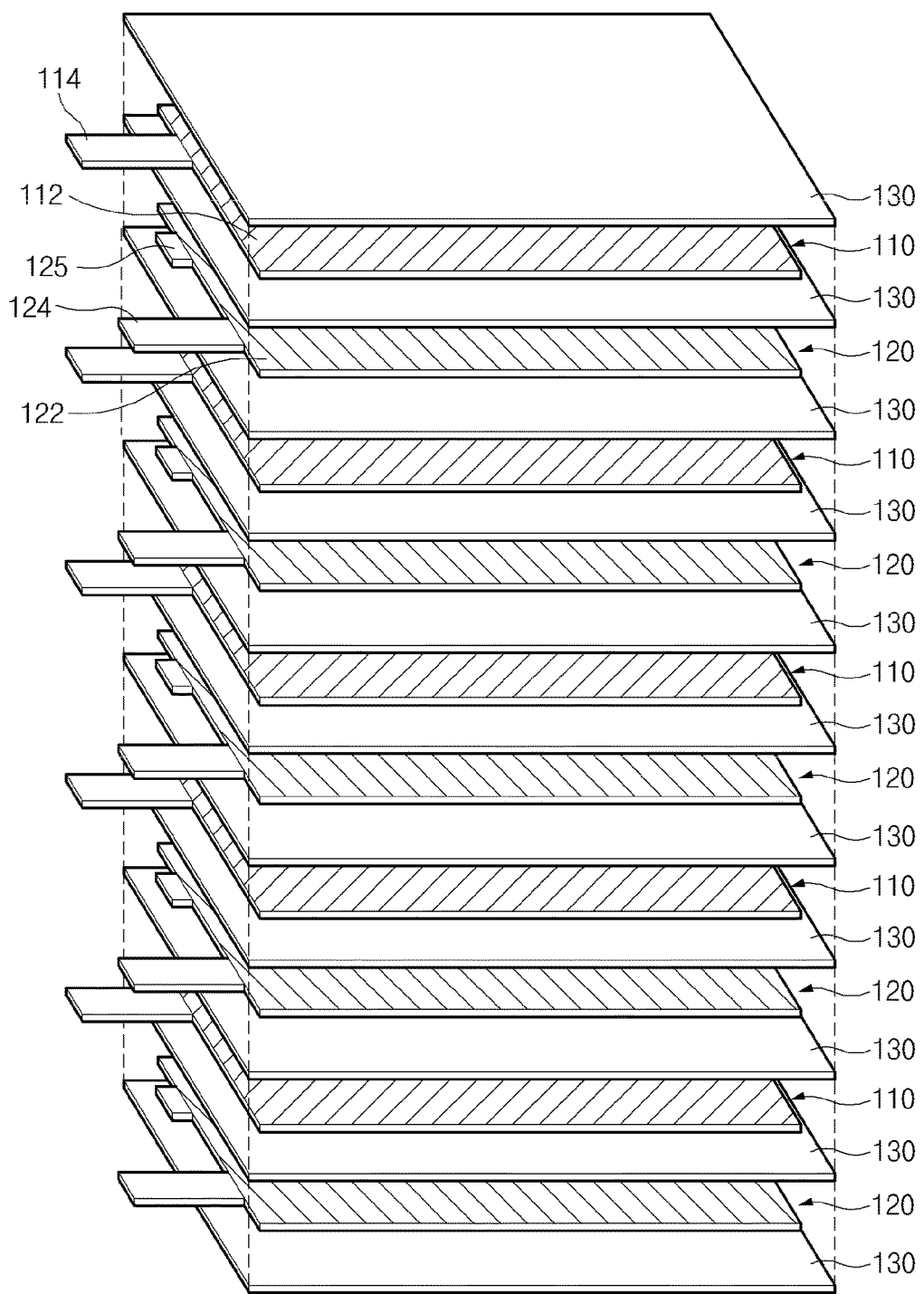
FIG. 3 is an exploded view illustrating the electrode assembly according to the embodiment of the present invention.

FIG. 1 illustrates a portion of an electrode assembly according to an embodiment of the present invention. FIG. 2 illustrates a cathode plate and an anode plate which are illustrated in FIG. 1. FIG. 3 is an exploded view illustrating the electrode assembly according to the embodiment of the present invention.

First, referring to FIG. 1, a cathode plate 110 may be formed of aluminum or an aluminum alloy. At least one of both surfaces 116 and 118 of the cathode plate 110 may be coated with a cathode active material layer 112. Hereinafter, it is assumed that the surface in a direction of an anode plate 120 of the both surfaces of the cathode plate 110 is coated with the cathode active material layer 112. The cathode active material layer 112, for example, may include lithium titanium oxide (LTO). A cathode tab 114 may be disposed at an end of one side of the cathode plate 110. The anode plate 120 may be formed of copper or a copper alloy. At least one of both surfaces 126 and 128 of the anode plate 120 may be coated with an anode active material layer 122. Hereinafter, it is assumed that the surface in a direction of the cathode plate 110 of the both surfaces of the anode plate 120 is coated with the anode active material layer 122. The anode active material layer 122 may include an anode active material capable of intercalating or deintercalating lithium ions, and a carbon-based anode active material, such as crystalline or amorphous carbon or a carbon composite, may be used as the anode active material. However, the anode active material in the present invention is not limited to the above-described kinds of the anode active materials.

An anode tab 124 may be disposed at an end of one side of the anode plate 120. The anode tab 124 may be formed in the same direction as that of the cathode tab 114 of the cathode plate 110. The anode tab 124 may be formed at a position not overlapping the cathode tab 114. Also, at the end of the one side of the anode plate 120, a protrusion 125 may be formed at a position being spaced apart from the anode tab 124 and overlapping the cathode tab 114. The protrusion 125, for example, may be formed at a position overlapping the cathode tab 114. The protrusion 125, for example, may be formed by changing a notching die or a notching pattern (e.g., with respect to laser notching) during notching for preparing the anode plate 120.

A separator 130 may insulate the cathode plate 110 and the anode plate 120 by being disposed between the cathode plate 110 and the anode plate 120. The separator 130, for example, may be formed of a nonwoven fabric. The separator 130, for example, may be formed by including any one of polyethylene, polypropylene, polyvinylidene fluoride, polyethylene oxide, polyacrylonitrile, and polyvinylidene fluoride hexafluoropropylene.

As illustrated in FIG. 1, the separator 130 may not only be disposed between the cathode plate 110 and the anode plate 120, but may also cover and insulate the cathode plate 110 or the anode plate 120 located at the outermost of an electrode assembly 100. Thus, the separator 130 may not only insulate between the cathode plate 110 and the anode plate 120, but may also be configured to insulate between the electrode assembly 100 and other devices.

Referring to FIG. 2, an area of the cathode plate 110 may be the same or smaller than an area of the anode plate 120. Hereinafter, it is assumed that the area of the cathode plate 110 is smaller than the area of the anode plate 120.

A surface of the cathode tab 114, which extends from the surface of the cathode plate 110 coated with the cathode active material layer 112, may be coated with the cathode active material layer 112 as long as a predetermined length in a longitudinal direction.

The anode tab 124 may be formed at a position not overlapping the cathode tab 114.

The protrusion 125 of the anode plate 120 may be formed at a position overlapping the cathode tab 114. The protrusion 125 may protrude from the anode plate 120 to a point corresponding to the predetermined length. A width of the protrusion 125 may be the same as a width of the cathode tab 114. That is, the protrusion 125 may protrude from the anode plate 120 to a point where it may entirely cover the cathode active material layer 112 coated on the surface of the cathode tab 114.

Referring to FIG. 3, the electrode assembly 100 may be formed by stacking the cathode plates 110, the anode plates 120, and the separators 130. Although not illustrated in FIG. 3, the separator 130 may insulate the anode plate 120 or the cathode plate 110, which are stacked above the cathode plate 110 or below the anode plate 120, by being disposed above the cathode plate 110 or below the anode plate 120 as illustrated in FIG. 2.

As described above, the surface of the cathode tab 114 of the cathode plate 110 may be coated with the cathode active material layer 112 as long as a predetermined length in a longitudinal direction. This may be due to non-uniformity in a process of coating the cathode plate 110 with the cathode active material 112 and may also be due to non-uniformity of notching in a process of forming the cathode plate 110. As a result, a case may occur in which a portion of the surface of the cathode tab 114 coated with the cathode active material layer 112 may deviate from the anode plate 120. That is, despite the fact that the area of the cathode plate 110 is smaller than that of the anode plate 120, the case may occur in which the portion of the surface of the cathode tab 114 coated with the cathode active material layer 112 may deviate from the anode plate 120.

In a charge and discharge process of a secondary battery, the cathode plate 110 and the anode plate 120 may transfer lithium ions through the separator 130. However, in the case where the portion of the surface of the cathode tab 114 coated with the cathode active material layer 112 deviates from the anode plate 120 as described above, lithium ions discharged from the deviated portion may not be transferred to the anode plate 120 but may be accumulated in the separator 130. The lithium ion accumulation in the separator 130 may be followed by metal precipitation, and this may cause limitations in the stability of the secondary battery.

However, as described above, the anode plate 120 of the electrode assembly 100 according to an embodiment of the present invention includes the protrusion 125 that is formed at a position overlapping the cathode tab 114. Thus, even in the case where the portion of the surface of the cathode tab 114 coated with the cathode active material layer 112 deviates the anode plate 120, lithium ions discharged from the coated portion of the cathode tab 114 may be transferred to the protrusion 125 of the anode plate 120. Therefore, the electrode assembly 100 according to the embodiment of the present invention may prevent the lithium ion accumulation in the separator 130, and furthermore, may improve stabilities of the electrode assembly 100 and a secondary battery 200 (see FIG. 4).

Figure 4:
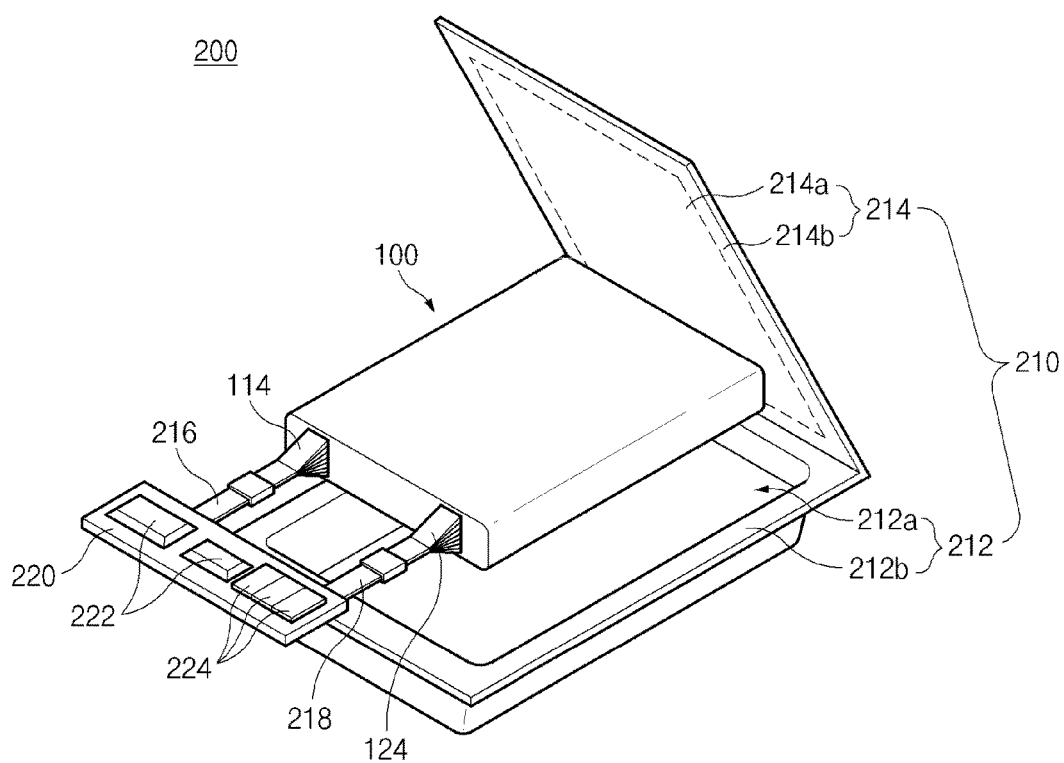
FIG. 4 illustrates a secondary battery including the electrode assembly according to the embodiment of the present invention.

FIG. 4 illustrates a secondary battery including the electrode assembly according to the embodiment of the present invention.

Referring to FIG. 4, the secondary battery 200 including the electrode assembly 100 according to the embodiment of the present invention may include the electrode assembly 100, an outer case 210, and a protective circuit module 220, which are described with reference to FIGS. 1 to 3.

The outer case 210 may include a main body 212 and a cove 214.

The main body 212 may include an accommodation part 212a as a space for accommodating the electrode assembly 100 and a sealing part 212b that is included by extending from an entrance of the accommodation part 212a.

The cover 214 may extend from any edge of the sealing part 212b of the main body 212.

The cover 214 may include a cover area 214a and a sealing part 214b.

The cover area 214a may correspond to the accommodation part 212a of the main body 212 to cover the accommodation part 212a of the main body 212. For example, an area of the cover area 214a may be the same or greater than an area of the accommodation part 212a of the main body 212.

The sealing part 214b may correspond to the sealing part 212b of the main body 212.

Therefore, with respect to the secondary battery 200, the electrode assembly 100 is accommodated in the accommodation part 212a and the sealing part 212b of the main body 212 and the sealing part 214b of the cover 214 are sealed by a method such as heat fusion.

In this case, the secondary battery 200 may include a cathode lead 216 extending from the cathode tabs 114 of the electrode assembly 100 and an anode lead 218 extending from the anode tabs 124.

The protective circuit module 220 is electrically connected to the electrode assembly 100 through the cathode lead 216 and the anode lead 218. The protective circuit module 220 may include control devices 222 controlling the secondary battery 100. The protective circuit module 220 may control charge and discharge of the secondary battery 200. The protective circuit module 220 may connect the secondary batter 200 and an external device through external terminals 224.

As described above, the anode plate 120 of the electrode assembly 100 according to the embodiment of the present invention includes the protrusion 125 that is formed a position overlapping the cathode tab 114. Thus, even in the case where the portion of the surface of the cathode tab 114 coated with the cathode active material layer 112 deviates from the anode plate 120, lithium ions discharged from the coated portion of the cathode tab 114 may be transferred to the protrusion 125 of the anode plate 120. Therefore, the stability of the secondary battery 200 may be improved.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An electrode assembly comprising:
   a first electrode plate having a first electrode tab at an end of one side thereof;
   a second electrode plate having a second electrode tab, which is formed in a same direction as a longitudinal direction of the first electrode tab and is formed at a position not overlapping the first electrode tab, and a protrusion which is formed at a position overlapping the first electrode tab; and
   a separator insulating the first electrode plate and the second electrode plate,
   wherein an area of the first electrode plate is smaller than an area of the second electrode plate,
   wherein the first electrode plate is a cathode plate and the second electrode plate is an anode plate, and
   wherein the second electrode plate is configured such that some lithium ions discharged from the first electrode tab can be transferred to the protrusion and other lithium ions discharged from the first electrode tab can be transferred to the second electrode plate,
   wherein a width of the protrusion is the same as a width of the first electrode tab, and
   wherein at least one surface of the first electrode plate and a portion of a surface of the first electrode tab are coated with a first electrode active material and at least one surface of the second electrode plate and a portion of a surface of the protrusion are coated with a second electrode active material such that a portion of the first electrode active material on the first electrode tab overlaps a portion of the second electrode active material on the second electrode plate and another portion of the first electrode active material on the first electrode tab overlaps the second electrode active material on the protrusion.

2. The electrode assembly of claim 1,
   wherein the portion of the surface of the first electrode tab, which extends from a surface of the first electrode plate coated with the first electrode active material, is coated with the first electrode active material as long as a predetermined length in the longitudinal direction.

3. The electrode assembly of claim 2, wherein the protrusion protrudes from the second electrode plate to a point corresponding to the predetermined length.

4. The electrode assembly of claim 3,
   wherein the portion of the surface of the protrusion, which extends from a surface of the second electrode plate coated with the second electrode active material, is coated with the second electrode active material to the point corresponding to the predetermined length.

5. A secondary battery comprising:
   an electrode assembly; and
   a pouch accommodating the electrode assembly,
   wherein the electrode assembly comprises:
   a first electrode plate having a first electrode tab at an end of one side thereof;
   a second electrode plate having a second electrode tab, which is formed in a same direction as a longitudinal direction of the first electrode tab and is formed at a position not overlapping the first electrode tab, and a protrusion which is formed at a position overlapping the first electrode tab; and a separator insulating the first electrode plate and the second electrode plate, wherein an area of the first electrode plate is smaller than an area of the second electrode plate, wherein the first electrode plate is a cathode plate and the second electrode plate is an anode plate, and wherein the second electrode plate is configured such that some lithium ions discharged from the first electrode tab can be transferred to the protrusion and other lithium ions discharged from the first electrode tab can be transferred to the second electrode plate, wherein a width of the protrusion is the same as a width of the first electrode tab, and wherein at least one surface of the first electrode plate and a portion of a surface of the first electrode tab are coated with a first electrode active material and at least one surface of the second electrode plate and a portion of a surface of the protrusion are coated with a second electrode active material such that a portion of the first electrode active material on the first electrode tab overlaps a portion of the second electrode active material on the second electrode plate and another portion of the first electrode active material on the first electrode tab overlaps the second electrode active material on the protrusion.

6. The secondary battery of claim 5, wherein the portion of the surface of the first electrode tab is coated with the first electrode active material as long as a predetermined length in the longitudinal direction.

7. The secondary battery of claim 6, wherein the protrusion protrudes from the second electrode plate to a point corresponding to the predetermined length.

8. The electrode assembly of claim 1, wherein a length of the first electrode plate in the longitudinal direction at a location remote from the first electrode tab is shorter than a length of the second electrode plate in the longitudinal direction at a location remote from the second electrode tab and protrusion.

9. The secondary battery of claim 5, wherein a length of the first electrode plate in the longitudinal direction at a location remote from the first electrode tab is shorter than a length of the second electrode plate in the longitudinal direction at a location remote from the second electrode tab and protrusion.

* * * * *